US012767800B1

(12) United States Patent
Skakandy et al.

(10) Patent No.: US 12,767,800 B1
(45) Date of Patent: Oct. 20, 2026

(54) DISPERSION STRENGTHENED SHOE MATERIAL

(71) Applicant: BBC International LLC, Boca Raton, FL (US)

(72) Inventors: Sean Skakandy, Jupiter, FL (US); Randy N. Lubart, Palm Beach Gardens, FL (US)

(73) Assignee: BBC International LLC, Plantation, FL (US)

( * ) Notice: Subject to any disclaimer, the term of this patent is extended or adjusted under 35 U.S.C. 154(b) by 639 days.

(21) Appl. No.: 18/333,771

(22) Filed: Jun. 13, 2023

Related U.S. Application Data

(60) Provisional application No. 63/368,479, filed on Jul. 14, 2022.

(51) Int. Cl.

| | |
|---|---|
| ***C08J 3/24*** | (2006.01) |
| ***C08J 3/11*** | (2006.01) |
| ***C08J 9/00*** | (2006.01) |
| ***C08J 9/04*** | (2006.01) |
| ***C08J 9/10*** | (2006.01) |
| ***C08K 5/14*** | (2006.01) |
| ***C08L 23/0853*** | (2025.01) |

(52) U.S. Cl.
CPC ............. *C08L 23/0853* (2013.01); *C08J 3/11* (2013.01); *C08J 9/0061* (2013.01); *C08J 9/103* (2013.01); *C08K 5/14* (2013.01); *C08J 2203/04* (2013.01); *C08J 2205/06* (2013.01); *C08J 2323/08* (2013.01); *C08J 2400/26* (2013.01); *C08J 2423/16* (2013.01); *C08L 2205/18* (2013.01); *C08L 2207/04* (2013.01)

(58) Field of Classification Search
None
See application file for complete search history.

(56) References Cited

U.S. PATENT DOCUMENTS

| | | | | |
|---|---|---|---|---|
| 2007/0135580 | A1 * | 6/2007 | Tirelli | C08L 23/10 525/240 |
| 2008/0275187 | A1 | 11/2008 | Tsou et al. | |
| 2010/0331452 | A1 | 12/2010 | Tsou et al. | |
| 2020/0281314 | A1 | 9/2020 | Stockbridge et al. | |
| 2021/0371633 | A1 | 12/2021 | Li et al. | |
| 2023/0272214 | A1 | 8/2023 | Wu et al. | |

FOREIGN PATENT DOCUMENTS

| | | | | |
|---|---|---|---|---|
| CN | 104448521 | | 9/2016 | |
| CN | 108586905 A | * | 9/2018 | C08J 9/103 |
| FR | 2781712 A1 | * | 2/2000 | B29B 17/0026 |

OTHER PUBLICATIONS

Machine translation of CN-108586905-A (no date).*
Machine translation of FR-2781712-A1 (no date).*
Nordel EPDM Product Selection Guide by Dow. (Year: 2026).*
Nordel IP 4725P Hydrocarbon Rubber Technical Data Sheet, by Dow (no Date).*

* cited by examiner

*Primary Examiner* — Michael J Feely
(74) *Attorney, Agent, or Firm* — McHale & Slavin, P.A.

(57) ABSTRACT

The invention involves a system and method for constructing a material useful for the production of shoes and shoe components. The material is constructed as a dispersion strengthened material including at least two materials that are typically considered to be non-compatible with respect to each other, e.g. a thermoplastic and a rubber. The non-compatible materials are combined in a manner that disperses one of the materials, preferably the rubber, throughout a matrix of the thermoplastic. In this manner, the properties of both materials, the softness of the thermoplastic and the toughness and durability of the rubber, are utilized to provide the properties of the resulting dispersion strengthened material.

20 Claims, 3 Drawing Sheets

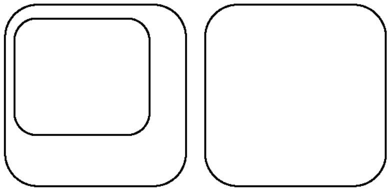

100

SOP/Procedure Polymer Synthesis Formulations, and Preparations

Date: May 25, 2022

I. Introduction:

102

To create the P(E-VA) copolymer. The reaction is based on a high proportion of vinyl acetate VA (70%) is referred to as ethylene-vunyl acetate rubber. The mixture should consist of ethylene and vinyl acetate. The rest of the mixture will be a secondary addition of the ethylene and vinyl acetate copolymer creating the Poly-mixture. Additional ingredients typically include (fillers, reaction activators, accelerators, plasticizers, antioxidants, and vulcanizing agents). The content of various additives is fixed at known proportions. Further processing includes mixing, pre-forming molding, application to substrates, extrusion, and vulcanization to create the finished rubber. Mixing and processing are typically preformed on open mills, internal mixers and extruders.

II. Procedure: Shows the proportions of raw materials used in the formulation of rubber mixture.

| Ref. | Formulation Material | Material Company | Material Grade | Usage | Function & Description |
|---|---|---|---|---|---|
| 104 | | | | | |
| 106 | EVA | BASF-YPC Company Limited | 6110M | 40kg | Resin: Ethylene-Vinyl Acetate (EVA) |
| 108 | EPDM | Dow Chemical Company | NORDEL™ IP 3745P | 8kg | Resin: Ethylene Propylene Diene Monomer |
| 110 | TPE | | | 8kg | Resin: Thermoplastic Elastomer |
| | POE | Dow Chemical Company | ENGAGE™ 8150 | 10kg | Resin: Polyolefin Elastomer |
| 112 | Talcum Powder | | | 6kg | Filler: Reduce the usage of Resin |
| 114 | AC | | | 1.5kg | Blowing Agent |
| 116 | DCP | | | 0.4kg | Vulcanizing Agent |
| 118 | ZnO | | | 0.85kg | Activator |
| 120 | ST | | | 0.5kg | Stearic Acid |

FIG. 1

Company Name 1

Factory Test Report - Production Material
Midsole - EVA Foam EVA Outsole

FACTORY 1

Factory Name: Factory 1

Laboratory Use Only
Lab Ref. No.: AHJTR22001008

| | | | |
|---|---|---|---|
| Supplier/Factory: | | O Production Material O Production Re-test | |
| Supplier's Country | CHINA | O New/Developmental | |
| Description: | EVA OUTSOLE | o Tech 2 o Tech 3 o Tech 4 | |
| Test Objective: | | O Sales Sample | |
| Color(s): | | RAM NO: | |
| Model No./Style | | Received Date: | 2022.1.7 |
| P.O./Lot No.: | | Tested Date: | 2022.1.8 |
| Quantity (Total) | | Finished Date: | 2022.1.15 |
| Sent By; | DANNY HUANG | Technician: | ARYA XIE |

| | Test Items | | TM Code | Units | Company Name 2 Requirement ID: 01934062 | Test Results | | RAM STD | Weakpoint |
|---|---|---|---|---|---|---|---|---|---|
| | | | | | | Results | Ave | | |
| | Suntest Suntest | | FT-11 | Greyscale | MIN 4 | 4.5 | | PASS | |
| | Hardness Measurement | v | GE-09 | Asker C | / | 55 | | DATA | |
| 124 | Fatigue Bending/23oC | v | GE-11 | Cycles | MIN 50,000 | NO DAMAGE | | PASS | |
| | Resilience | v | GE-12 | % | MIN 35 | 44 | | PASS | |
| 126 | Compression Set Test | v | GE-13 | % | MAX 60 | 56.33 | | PASS | |
| 128 | Determination of Specific Gravity | v | GE-15 | g/cbcm | / | 0.305 | | DATA | |
| | Shrinkage Test | v | GE-16 | % | MAX 2.0 | 0.6 | | PASS | |
| 130 | DIN ABRASION DIN | v | GE-27 | CBMM | MAX 180 | 108 | | PASS | |
| | Split Tear | v | ST-02 | N/mm | MIN 3 | 6.26 | | PASS | |
| | Tear Strength | | ST-02 | N/mm | MIN 4 | 4.69 | | PASS | |
| | Breaking Elongation | | ST-03 | % | MIN 300 | 360 | | PASS | |
| 132 | Tensile Strength | | ST-03 | Mpa | MIN 3 | 4.95 | | PASS | |

Comment: Approved By: Confirmed By: ARYA XIE Reviewed By: ZARK LI

FIG. 4

DISPERSION STRENGTHENED SHOE MATERIAL

PRIORITY CLAIM

In accordance with 37 C.F.R. 1.76, a claim of priority is included in an Application Data Sheet filed concurrently herewith. Accordingly, the present invention claims priority to Application No. 63/368,479, entitled U.S. Provisional Patent "DISPERSION STRENGTHENED SHOE MATERIAL", filed Jul. 14, 2022. The contents of the above referenced application are incorporated herein by reference in its entirety.

FIELD OF INVENTION

The present invention generally relates to materials used for the construction of shoes and, more specifically, to a dispersion strengthened material for shoe outsoles, midsoles and insoles.

BACKGROUND INFORMATION

Footwear articles are most often made from polymer compositions containing elastomers. Some popular polymers include rubber, hydrogenated nitrile butadiene rubber, nitrile butadiene rubber, ethylene propylene diene monomer rubber, styrene-butadiene rubber. Uses of such materials are typically limited by the structural and/or performance limitations of the polymer compositions. Structural and/or performance limitations are typically addressed by increasing the quantity of the material or by expanding the material to create a foam.

Rubber has been commonly used in the world, ranging from the simplest industries, such as households, to many other important industrial products, including shoes. Rubber has its own history, dating back to about 1600 B.C. Rubber has been collected for a long time in its native Central and South America. Since then, rubber has become one of the most important materials used widely and daily in our lives.

Natural rubber is often vulcanized, a process by which the rubber is heated and sulfur, peroxide or bisphenol are added to improve resilience and elasticity, and to prevent it from perishing. Vulcanization greatly improves the durability and utility of rubber. The successful development of vulcanization is most closely associated with Charles Goodyear. Carbon black is often used as an additive to rubber to improve its strength, especially in vehicle tires.

EPDM rubber (ethylene propylene diene monomer rubber) is a type of synthetic rubber that is used in many applications. EPDM is an M-Class rubber under ASTM standard D-1418; the M class comprises elastomers having a saturated chain of the polyethylene type (the M deriving from the more correct term polymethylene). EPDM is made from ethylene, propylene, and a diene comonomer that enables cross-linking via sulfur vulcanization. The earlier relative of EPDM is EPR, ethylene propylene rubber (useful for high-voltage electrical cables), that contains no diene units and can only be cross-linked using radical methods such as peroxides. Dienes used in the manufacture of EPDM rubbers are ethylidene norbornene (ENB), dicyclopentadiene (DCPD), and vinyl norbornene (VNB). EPDM is derived from polyethylene into which 45-85 wt % of propylene has been copolymerized to reduce the formation of the typical polyethylene crystallinity. EPDM is a semi-crystalline material with ethylene-type crystal structures at higher ethylene contents, becoming essentially amorphous at ethylene contents that approach 50 wt %. Rubbers with saturated polymer backbones, such as EPDM, have much better resistance to heat, light, and ozone than unsaturated rubbers such as natural rubber, SBR, or neoprene (polychloroprene). This makes it suitable to be utilized in external harsh environments. As such, EPDM can be formulated to be resistant to temperatures as high as 150° C., and, properly formulated, e used outdoors for many years or decades without degradation. EPDM has good low-temperature properties, with elastic properties to temperatures as low as −40 C depending on the grade and the formulation.

As with most rubbers, EPDM is typically compounded with fillers such as carbon black and calcium carbonate, with plasticizers such as paraffinic oils, and has useful rubbery properties only when cross-linked. Cross-linking mostly takes place via vulcanization with sulfur, but is also accomplished with peroxides (for better heat resistance) or with phenolic resins.

Ethylene-vinyl acetate (EVA), also known as poly (ethylene-vinyl acetate) (PEVA), is the copolymer of ethylene and vinyl acetate. The weight percent of vinyl acetate usually varies from 10% to 40%, with the remainder being ethylene. There are three different types of EVA copolymer, which differ in the vinyl acetate (VA) content and the way the materials are used, The EVA copolymer which is based on a low proportion of VA (approximately up to 4%) may be referred to as vinyl acetate modified polyethylene. It is a copolymer and is processed as a thermoplastics material, just like low density polyethylene. It has some of the properties of a low density polyethylene, but increased gloss (useful for film), softness and flexibility.

The EVA copolymer, which is based on a medium proportion of VA (approximately 4% to 30%), is referred to as thermoplastic ethylene-vinyl acetate copolymer and is a thermoplastic elastomer material. It is not vulcanized, but has some of the properties of a rubber or of plasticized polyvinyl chloride, particularly at the higher end of the range. Both filled and unfilled EVA materials have good low temperature properties and are tough. The materials with approximately 11% VA are used as hot melt adhesives.

The EVA copolymer, which is based on a high proportion of VA (greater than 608), is referred to as ethylene-vinyl acetate rubber. EVA is an elastomeric polymer that produces materials which are "rubber-like" in softness and flexibility. The material has good clarity and gloss, low-temperature toughness, stress-crack resistance, waterproof properties, and resistance to UV radiation. EVA materials are currently used for some types of shoes and sandals that have low performance expectations; an example is Crocs™ and some flip flops. While these shoes are soft in feel, they wear quickly and are not suitable for applications where the user expects the shoe to perform under high loads.

One drawback of shoe materials relates to the necessity for shoes to have excellent cushioning properties. Generally, foamed materials such as EVA are used for shoe sole members to satisfy these requirements. A material having low stiffness (being soft) and high cushioning properties is usually deformed greatly when subjected to a load. Therefore, shoes that include a foam product of a high expansion ratio may be excessively deformed when subjected to a high load. In this case, there are problems that the deformation greatly impairs agility and increases the risk of injury to the wearer; especially sports shoes, such as basketball shoes and running shoes, of which the shoe soles are liable to be subjected to a high load, and are required to include a shoe sole member having a relatively small amount of strain (amount of deformation) when subjected to a high load. When the expansion ratio of the foam product in the shoe sole member is made low, the amount of strain to the shoe sole member becomes relatively small; however, the cushioning properties of the shoe sole member are also lowered in normal use, causing a hard wearing feeling when the foot fits into the shoe.

Thus, what is needed in the art of shoes is a combination of materials that are considered to be non-compatible chemically, but if combined, could produce a combination of properties that would be beneficial to the production of household goods, such as shoes, to provide the desired cushioning from soft materials and wear properties from harder materials. The material should be practical to manufacture with known manufacturing machinery and should be amenable to the manufacturing processes used for the production of shoes.

SUMMARY OF THE INVENTION

Briefly, the invention involves a material useful for the production of shoes and shoe components. The material is constructed as a dispersion strengthened material including at least two materials that are typically considered to be non-compatible with respect to each other, e.g. a thermoplastic and a rubber. The non-compatible materials are combined in a manner that disperses one of the materials, preferably the rubber, throughout a matrix of the thermoplastic. In this manner, the properties of both materials, the softness of the thermoplastic and the toughness and durability of the rubber, are utilized to provide the properties of the resulting dispersion strengthened material.

Accordingly, it is an objective of the present invention to provide a dispersion strengthened material for shoes.

It is a further objective of the present invention to provide a dispersion strengthened material including a thermoplastic matrix having rubber particles dispersed throughout the EVA matrix.

It is yet a further objective of the present invention to provide a dispersion strengthened material including about 50% EVA thermoplastic and about 10% EPDM rubber, the remainder being made up of plasticizer, vulcanizing agent and filler.

Other objectives and advantages of this invention will become apparent from the following description taken in conjunction with the accompanying drawings wherein are set forth, by way of illustration and example, certain embodiments of this invention. The drawings constitute a part of this specification, include exemplary embodiments of the present invention, and illustrate various objects and features thereof.

BRIEF DESCRIPTION OF THE FIGURES

FIG. 1 illustrates a representative formulation for mixing one embodiment of the present dispersion strengthened material;

FIG. 4 is a test report of a sample of the dispersion strengthened material.

DETAILED DESCRIPTION OF THE PREFERRED EMBODIMENTS

Figure 2:
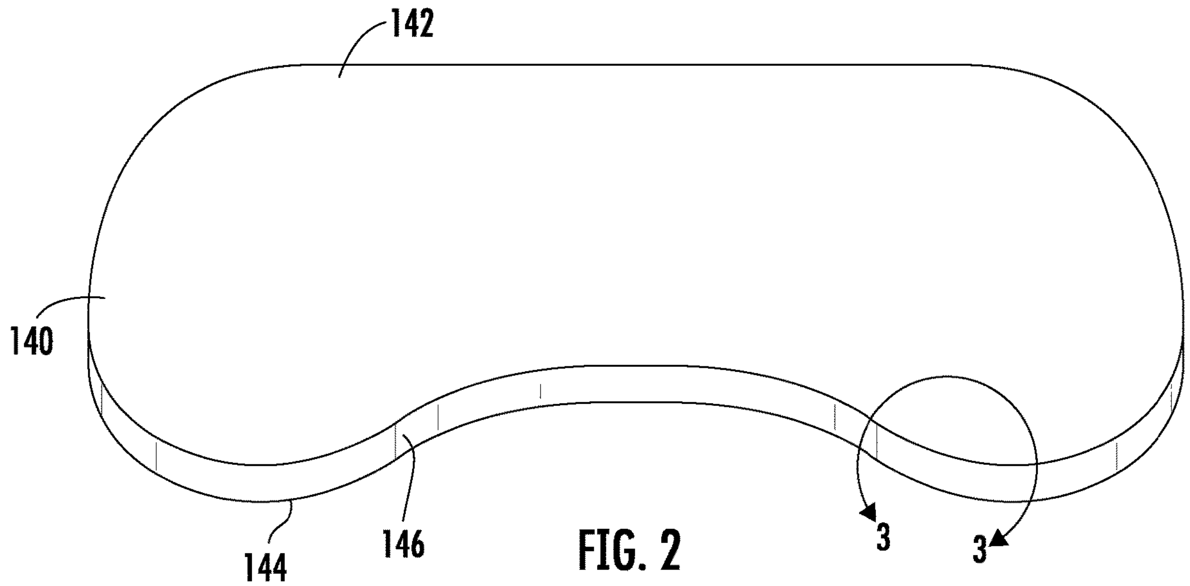
FIG. 2 is a perspective view of a shoe outsole constructed from the present dispersion strengthened material.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Figure 3:
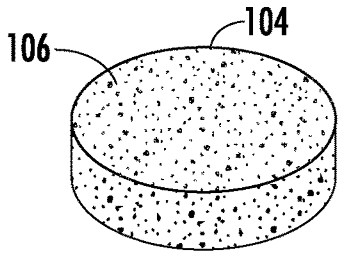
FIG. 3 is a section taken along lines 3-3 of FIG. 2 illustrating the rubber material dispersed throughout the thermoplastic material.

Referring generally to FIGS. 1-3, a dispersion strengthened material 100 and method for making the dispersion strengthened material 102 are illustrated and described. The dispersion strengthened material 100 includes a thermoplastic material (EVA) 104 and a rubber (EPDM) 106, which are generally considered to be incompatible, with each combined into a material having properties suitable for use in the construction of shoes.

The major challenge to blending EPDM 106 and EVA 104 is the incompatibility between the materials. Thus, the present invention provides homogenous mixture wherein the EPDM is distributed throughout the EVA matrix to define a dispersion strengthened material 100. When evenly distributed, the EVA thermoplastic 104 provides a material that may be foamed or polmersor expanded plastic that is highly compressive and thus absorbs shock, while the EPDM rubber material 106 provides high wear, surface adhesion, foot and ankle support and UV resistance. The dispersion strengthened material 100, once mixed, can be processed much like existing materials used for shoe construction.

The materials may be mixed in a suitable mixing machine, such as a Brabender (not shown) operating at about 50 revolutions per minute for a suitable time period, which may be between two minutes and thirty minutes at temperatures up to 195 degrees Celsius. The material may also be mixed in a screw type extruder and extruded as a shape or plate which can be further processed by cutting into strips or shapes for molding n a compression press which may include vulcanization of the EPDM while in situ within the EVA matrix. Internal mixers and the like may be utilized in place of the Brabender or the extruder without departing from the scope of the invention. It should be generally noted that particle size will affect the ability of the thermoplastic and the rubber to homogenize, and that smaller particle size will typically allow a more homogenous mixture. Should smaller particles not be available, mixing up to and at an elevated temperature will aid in providing a homogenous mixture. It should be noted that while a homogenous mixture is desired, there may be applications for the present dispersion strengthened material where a non-homogenous mixture would be beneficial, particularly if the EPDM 106 can be concentrated in areas of high wear or high compression.

Referring to FIG. 1, an exemplary embodiment is illustrated including (EVA) 104 Ethylene Vinyl Acetate from BASF-YPC Company Limited, material grade 6110M in a quantity of 53% of the mixture is mixed with (EPDM) 106 Ethylene Propylene Diene Monomer from Dow Chemical Company, trade name Nordel IP3745P, as about 11% of the mixture, Thermoplastic Elastomer (TPE) 108 as about 11% of the mixture for a plasticizer, (POE) 110 Polyolefin Elastomer from the Dow Chemical Company, trade name Engage 8150, as about 13% of the mixture for a plasticizer, Talcum Powder 112 as about 6% of the mixture for a filler, (AC) 114 Azodicarbonamide as about 2% of the mixture for a blowing agent, (DCP) 116 Dicumyl Peroxide as about 0.5% of the mixture for a vulcanizing agent and cross linker, (ZnO) 118 Zinc Oxide as about 0.85% of the mixture as an activator to boost vulcanization, and (ST) 120 Stearic Acid as about 0.5% of the mixture for a lubricant. It should be noted that this is currently the preferred embodiment. It should also be noted that other combinations of EVA 104 and EPDM 106 may be utilized without departing from the scope of the invention. EVA 104 may range from about 5% of the mixture to about 95% of the mixture with the EPDM 106 making up the reciprocal percentage and the additive chemicals varied to correspond to the respective amount of the EVA and EPDM. It should also be noted that increasing the percentage of EPDM 106 with respect to the EVA 104 will result in a harder dispersion strengthened material, while higher percentages of EVA will result in a softer dispersion strengthened material. Further, it should be noted that the term "about" as used herein refers to approximately or nearly, complying with industry norms for weight measurements.

Referring to FIG. 4, a sheet of test criteria completed for the present dispersion strengthened material is illustrated. In the test criteria it can be seen that the material exceeds current specifications for materials utilized for shoe outsoles, insoles and midsoles. Notable parameters were the fatigue bending test 124. While it remains unknown how many cycles the material will withstand, the material was tested to over 50,000 cycles without a failure. Also notable is the resilience 126 which far exceeded the minimum with a 44; showing the material is highly flexible compressible with a compression test 128 of 56.33. Still, the material exhibited low losses in the abrasion test 130 and exhibited high tensile strength 132, requiring 4.95 Mpa (Megapascal) to break the dispersion strengthened material 100.

Referring to FIGS. 2 and 3, an outsole 140 constructed from the dispersion strengthened material is illustrated. FIG. 3 illustrates the distributed EPDM particles 106 positioned throughout the EVA 104 substrate. As shown, the harder EPDM particles interact with the top surface 142 of the outsole 140, as well as the ground engaging surface 144 along with the EVA 104. Because the EPDM particles 106 are also distributed throughout the central portion 146 of the outsole 140, compression of the outsole 140 is also affected by making the dispersion strengthened material 100 harder than pure EVA and softer than pure EPDM. Those skilled in the art will recognize that varying the amounts of EVA and EPDM will allow the hardness, wear resistance and compression, as well as other parameters, to be modified to suit particular needs. It should also be noted that the present invention has other uses besides shoes such, but not limited to, yoga mats, exercise mats, slip-resistant floor mats, baby changing mats, work station mats, protective padding e.g. automotive and sports, practice dummies for contact sports, internal insulation and waterproofing. It should also be noted that the present combination provides the ability to recycle materials that heretofore unable to be recycled because the incompatibility of the materials.

It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention, which are obvious to those skilled in the art, are intended to be within the scope of the following claims.

What is claimed is:

1. A dispersion strengthened material comprising:

a mixture of virgin EPDM (ethylene propylene diene monomer) rubber pellets, which are free-flowing; and a solid thermoplastic matrix material, which is chemically incompatible with the virgin EPDM rubber pellets; and optional additive materials;

wherein the virgin EPDM rubber pellets are dispersed throughout the solid thermoplastic matrix material; and wherein the solid thermoplastic matrix material is present in amount of about 5% to about 95% by weight of the mixture, and the virgin EPDM rubber pellets are present in an amount of about 5% to about 95% by weight of the mixture, wherein a combined amount of the solid thermoplastic matrix material and the virgin EPDM rubber pellets is 100% by weight of the mixture.

2. The dispersion strengthened material as claimed in claim 1, wherein at least a portion of the virgin EPDM rubber pellets are positioned on an outer surface of the dispersion strengthened material.

3. The dispersion strengthened material as claimed in claim 1, wherein the solid thermoplastic matrix material is EVA (ethylene vinyl acetate).

4. The dispersion strengthened material as claimed in claim 3, wherein:

the EVA thermoplastic matrix material accounts for about 53% by weight of the dispersion strengthened material;

the virgin EPDM rubber pellets account for about 11% by weight of the dispersion strengthened material;

a thermoplastic elastomer plasticizer is present as an additive material in an amount of about 11% by weight of the dispersion strengthened material;

a polyolefin elastomer plasticizer is present as an additive material in an amount of about 13% by weight of the dispersion strengthened material;

a talcum powder filler is present as an additive material in an amount of about 6% by weight of the dispersion strengthened material;

an azodicarbonamide blowing agent is present as an additive material in an amount of about 2% by weight of the dispersion strengthened material;

a dicumyl peroxide vulcanizing agent is present as an additive material in an amount of about 0.5% by weight of the dispersion strengthened material;

a zinc oxide vulcanization activator is present as an additive material in an amount of about 0.85% by weight of the dispersion strengthened material; and a stearic acid lubricant is present as an additive material in an amount of about 0.5% by weight of the dispersion strengthened material.

5. The dispersion strengthened material as claimed in claim 1, wherein a talcum powder filler is present as an additive material in an amount of about 6% by weight of the dispersion strengthened material.

6. The dispersion strengthened material as claimed in claim 1, which is suitable for use in the construction of a shoe.

7. The dispersion strengthened material as claimed in claim 6, wherein the virgin EPDM rubber pellets are concentrated in areas of high wear with respect to the shoe.

8. The dispersion strengthened material as claimed in claim 1, wherein a stearic acid lubricant is present as an additive material in an amount of about 0.5% by weight of the dispersion strengthened material.

9. The dispersion strengthened material as claimed in claim 1, wherein the thermoplastic matrix material accounts for at least 50% by weight of the dispersion strengthened material.

10. The dispersion strengthened material as claimed in claim 1, wherein the virgin EPDM rubber pellets account for at least 10% by weight of the dispersion strengthened material.

11. The dispersion strengthened material as claimed in claim 1, at least one plasticizer is present as an additive material.

12. The dispersion strengthened material as claimed in claim 11, wherein the at least one plasticizer comprises a thermoplastic elastomer present in an amount of about 11% by weight of the dispersion strengthened material.

13. The dispersion strengthened material as claimed in claim 11, wherein the at least one plasticizer comprises a polyolefin elastomer present in an amount of about 13% by weight of the dispersion strengthened material.

14. The dispersion strengthened material as claimed in claim 1, wherein a blowing agent is present as an additive material.

15. The dispersion strengthened material as claimed in claim 14, wherein the blowing agent is azodicarbonamide present in an amount of about 2% by weight of the dispersion strengthened material.

16. The dispersion strengthened material as claimed in claim 1, wherein a vulcanizing agent is present as an additive material.

17. The dispersion strengthened material as claimed in claim 16, wherein the vulcanizing agent is dicumyl peroxide present in an amount of about 0.5% by weight of the dispersion strengthened material.

18. The dispersion strengthened material as claimed in claim 16, wherein a zinc oxide vulcanization activator is present as an additive material in an amount of about 0.85% by weight of the dispersion strengthened material.

19. The dispersion strengthened material as claimed in claim 16, wherein the virgin EPDM rubber pellets are capable of undergoing in situ vulcanization during further processing of the dispersion strengthened material.

20. The dispersion strengthened material as claimed in claim 19, wherein the further processing is molding in a compression press.

* * * * *